United States Patent
Simon et al.

(10) Patent No.: US 11,189,856 B2
(45) Date of Patent: Nov. 30, 2021

(54) METHOD AND PRODUCTION EQUIPMENT FOR PRODUCING A BATTERY AND MOTOR VEHICLE WITH A CORRESPONDING BATTERY

(71) Applicant: AUDI AG, Ingolstadt (DE)

(72) Inventors: Martin Simon, Ingolstadt (DE); Markus Thurmeier, Adlkofen (DE); Oliver Schieler, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/693,759

(22) Filed: Nov. 25, 2019

(65) Prior Publication Data

US 2020/0176806 A1 Jun. 4, 2020

(30) Foreign Application Priority Data

Nov. 29, 2018 (DE) .......................... 102018220626.0

(51) Int. Cl.
| | |
|---|---|
| *H01M 10/04* | (2006.01) |
| *H01M 10/65* | (2014.01) |
| *H01M 50/20* | (2021.01) |
| *H01M 10/653* | (2014.01) |

(52) U.S. Cl.
CPC ..... *H01M 10/0404* (2013.01); *H01M 10/653* (2015.04); *H01M 50/20* (2021.01); *H01M 2220/20* (2013.01)

(58) Field of Classification Search
CPC ...... H01M 50/20; H01M 50/10; H01M 10/04; H01M 10/653
See application file for complete search history.

(56) References Cited

U.S. PATENT DOCUMENTS

| | | | | |
|---|---|---|---|---|
| 6,465,125 | B1* | 10/2002 | Takami | H01M 10/052 429/127 |
| 2013/0004822 | A1* | 1/2013 | Hashimoto | H01M 10/6556 429/120 |
| 2017/0162837 | A1* | 6/2017 | Sada | H01M 50/183 |
| 2019/0131678 | A1* | 5/2019 | Kim | H01M 10/6567 |

FOREIGN PATENT DOCUMENTS

| | | |
|---|---|---|
| DE | 102013021205 A1 | 6/2015 |
| EP | 3444889 A1 | 2/2019 |
| WO | WO 2018-135757 A * | 7/2018 |

OTHER PUBLICATIONS

German Search Report dated Nov. 14, 2019, in corresponding German Application No. 10 2018 220 626.0 including partial machine-generated English language translation; 15 pages.

* cited by examiner

*Primary Examiner* — Kenneth J Douyette
(74) *Attorney, Agent, or Firm* — Maier & Maier, PLLC

(57) ABSTRACT

A method and production equipment for producing a battery and a motor vehicle with such a battery. In the method, at least one battery module is positioned and attached in a provided battery housing such that it covers at least one gap provided in a housing base of the battery housing. The housing base is then bent, outward along the gap, whereby a cavity is enlarged between the battery module and the housing base. A viscous heat-conductive filler is then supplied into the cavity through the gap. Subsequently, the bending of the housing base is reversed by pushing the housing base back in the direction of the battery module.

10 Claims, 2 Drawing Sheets

METHOD AND PRODUCTION EQUIPMENT FOR PRODUCING A BATTERY AND MOTOR VEHICLE WITH A CORRESPONDING BATTERY

FIELD

The invention relates to a method and production equipment for producing a battery, particularly a vehicle battery. The invention further relates to a motor vehicle with a corresponding battery, i.e. produced according to the method or by means of the production equipment. The battery may preferably be a traction battery for the motor vehicle.

BACKGROUND

The progress in battery technology, for example with respect to capacity and performance, is also associated with increased requirements, for example with respect to cooling or the thermal properties of the battery.

SUMMARY

The object of the present invention is to ensure improved thermal properties of a battery. This object is achieved according to the invention by the subject matters of the independent claims. Advantageous embodiments and refinements of the present invention are indicated in the dependent claims, the description, and the figures.

A production method according to the invention for a battery, particularly for a vehicle or traction battery, is thus designed to produce or manufacture the battery. Besides the method steps described, further, optional method steps may be provided for producing components or individual parts of the battery and/or the assembly thereof. A method step of the production method according to the invention comprises providing a battery housing for the battery with a housing base, which has at least one gap.

Gap in this sense should be understood as a slot or cut or a passage, which extends completely through the housing base, that is a material of the housing base, in a direction extending vertically with respect to a main extension plane or main extension surface of the housing base. The gap may be preferably oblongly extended in or along the main extension surface or main extension plane of the housing base. The gap may likewise, however, be a hole and then have, for example, a rectangular, round, or oblong, or stadium-shaped shape. This can depend particularly on an elasticity or flexibility, i.e. a mobility of the material of the housing base, wherein a smaller extension or dimension of the gap or hole may be selected, for example, for more elastic, i.e. elastically bendable in a greater scope, materials or housing base.

The gap may partially or completely extend through the housing base in its main extension surface or main extension plane. In the latter case, the housing base may thus be designed in multiple parts. Two parts of the housing base, also characterized as the base parts, can then come together along the gap. In doing so, the base parts may impact each other along the gap, i.e. make contact, or may be spaced apart from one another. The gap may thus have a microscopic or macroscopic extension.

The housing base may have several gaps, which may be designed similarly or differently, for example depending on the distance of the respective gap away from an edge of the housing base or of the battery housing. For example, the housing base may be connected to a side wall of the battery housing and thus be secured to a corresponding connecting point and accordingly be less elastically bendable in an edge area, without overloading the connection between the housing base and the side wall. Accordingly, the gap may be, for example, larger or longer, the closer it is to the edge or a connecting point, at which the housing base is connected to the side wall or another part of the battery housing.

In a further method step of the method according to the invention, at least one battery module is positioned and attached in the housing such that the at least one battery module covers the respective gap. In this case, the battery module may be or comprise an individual battery cell or comprise, i.e. have, several battery cells.

Different designs and arrangements are possible here. Preferably, each battery housing, for example, may cover precisely one gap. However, it is also possible for the battery module or one of the battery modules to cover several gaps and/or for the at least one gap to extend along or below several battery modules. For example, this may be dependent on a size or a weight of the battery modules and/or the elasticity or mobility of the housing base. Preferably, the at least one battery module may be connected, for example bolted, to the battery housing, for example the side wall and/or an internal structure of the battery or of the battery housing and/or to a housing cover.

In a later method step, the housing base is bent outward along the at least one gap, i.e. in a direction facing away from the at least one battery module, in order to enlarge a cavity between the at least one battery module and the housing base. Due to this bending, particularly also the gap may be enlarged or extended. Especially preferably in this case, regions or parts of the housing base adjoining the gap may not only be bent away from the battery module, but also bent away from the gap. In a bent state, the region or parts of the housing base, when viewed from the exterior, then have a concave shape. After the positioning and attaching of the battery module, the housing base may be initially at least substantially planar or flat in the battery housing. Due to the bending, at least the parts or regions of the housing base adjoining the respective gap are then moved out of their planar or flat starting position.

In a later method step, a viscous, heat-conductive filler may be placed in the cavity through the respective, bent gap. The filler (gap filler) may be, for example, a thermally conductive paste.

Subsequently, in a further method step, the elastic bending is reversed due to the pushing back of the housing base, i.e. of the regions or parts of the housing base adjoining the respective gap, in the direction of the battery module.

The method being proposed here has several advantages. Thus, due to the bending, i.e. due to the enlarging of the cavity between the battery module and the housing base, the filler can be subjected to less pressure than what would be possible without the bending when it should simultaneously be ensured that the filler in the end sufficiently covers or wets the battery module and/or an interior region of the housing base, i.e. the region facing the battery module, that is preferably completely or practically completely fills the cavity. Due to the lower pressure, damage to or negative impacts on the battery, for example a shifting of individual components in the battery housing, particularly of the battery module, or an undesirable bulging or yielding outward of the elastic housing base can advantageously be prevented. In addition, less complex production equipment may be used and possibly the energy required can be reduced accordingly due to the lower necessary pressure.

Furthermore, there is advantageously more flexibility in a selection of the filler, such that, for example, fillers can be used that have a higher viscosity, i.e. which are less flowable. According to one specification of the battery, it may be provided, for example, that the battery module is positioned and secured in the battery housing such that a distance of a predefined size, for example a distance of 0.5 mm, results between the battery module and the housing base. Production tolerances or inaccuracies may then mean that this distance is not maintained, i.e. is less for example, without undue effort. Due to the bending of the housing base and/or of the gap before supplying of the filler, it may be advantageously ensured that there is sufficient distance between the housing base and the battery module in order to place the filler in the cavity and to enable the distribution or spreading thereof in the cavity. Thus, it may be ensured that the filler actually is or may be distributed over an entire surface of the battery module or the cavity and beyond. In other words, it may thus be achieved that the filler fills up the cavity over the entire surface of the battery module and beyond and thus a heat-conductive or heat-conducting connection is established between the battery module and the housing base.

Due to the present method, an especially effective dissipation of heat from process heat resulting in the battery module during the operation thereof to the housing base can thus be especially reliably ensured. The housing base may be formed, for example, as a cooling element and/or permeated with lines for a cooling medium in order to further distribute or dissipate the process heat.

A further advantage of the present invention exists in that, based on the more reliable filling of the cavity with the filler, less or smaller fill openings for the filler, that is the least one gap here, must be provided in order to ensure the complete filling of the cavity with the filler or filling of the cavity that is sufficient according to a corresponding target or specification. On one hand, this may improve a mechanical stability of the housing and, on the other hand, reduce the production expense for producing the battery. In addition, more design clearance is obtained for the housing base, for example for a development or arrangement of cooling channels.

In an advantageous design of the present invention, a tractive force is exerted from outside of the battery housing onto parts of the housing base adjoining the respective gap on both sides in order to bend the housing base along the respective gap. In other words, the housing base is thus hoisted externally. This enables, previously or simultaneously, a production or assembly of the battery to be produced or continued on a side opposite the housing base. For example, the housing cover can be mounted thus before the bending or during the bending. Advantageously, also no sort of devices or no sort of installation space is then necessary in order to bend, for example, the housing base from the inside, i.e. from the battery housing outward. In addition, this also enables an especially reliable and uniform distribution of the supplied filler in the cavity. In order to apply the tractive force, a suction cup or another (partial) vacuum device is placed on the housing base from outside of the battery housing and then moved away from the battery housing with a corresponding actuator, for example electromotively, hydraulically, or pneumatically, such that the housing base is then also carried along. A protrusion, an undercut, an eyelet, and/or the like may likewise be provided, i.e. arranged, for example on the outside on the housing base, wherein a gripping device can then grip, in order to apply the tractive force, i.e. in order to bend the housing base.

The former variant, that is the use of the suction cup, has the advantage in this case that the housing base can be produced smoothly and thus especially simply or non-laboriously and in a space-saving manner. In contrast, the latter variant has the advantage that the tractive force may be applied possibly especially reliably, for example independently of any soiling of the housing base, and/or a greater tractive force can be used.

In a further advantageous design of the present invention, the housing base is moved no more than 3 mm away from the respective battery module, i.e. from a respective starting position, during the bending, particularly at the parts of the housing base adjoining the respective gap. With typical battery extensions, it can thereby advantageously be ensured that the bending of the housing base takes place in an elastic region, i.e. the housing base is not permanently or sustainably deformed by the bending. A more precise scope of the bending can then be specified or set specific to an individual case or application depending on the material and/or the size of the housing base, depending on a specification, i.e. a design specification of the battery housing, particularly with respect to a distance provided between the battery module and the housing base, depending on a given production tolerance, and/or depending on the viscosity of the filler. For example, the housing base or a section of the housing base may have a width of 200 mm between two attachment or connecting points, or the respective gap may extend 100 mm or 200 mm away from the edge of the housing base or from the respective attachment or connecting point in this section or region of the housing base. During the bending, the housing base can then be moved 1 mm from its starting position, i.e. relative to the battery module, in the region of the gap.

In a further advantageous design of the present invention, it is provided that the filler is distributed over a surface of the battery module facing the housing base on the inside of the housing, i.e. the bottom side thereof, due to the pushing back of the housing base in the direction of the battery module. This means that, during the pushing back, the filler is pushed through the housing base against the bottom side of the battery module and then deflected laterally due to the pressure. To this end, enough filler is supplied in the region of the gap such that the filler fills up the distance between the housing base and the battery module in the region of the gap, in the bent state. During pushing back, the filler can thereby also be pushed between the housing base and the battery module in regions of the cavity placed apart from the gap. Both filler and time may advantageously be saved due to this procedure.

Advantageously, the cavity in the bent state, for example, does not have to be completely filled by the filler If sufficient filler is supplied in the bent state, excess filler would ooze through the gap or spread undesirably or unnoticeably into other regions of the battery, for example between the battery module and the side wall of the battery housing, during pushing back due to the reduction in size of the cavity that occurs.

An injection head used to supply the filler through the gap may also remain in or on the gap during the pushing back in order to prevent the filler from escaping through the gap. Production time can be saved, because the housing base can be pushed back before the filler has reached an end of the cavity some distance away from the gap. The design of the present invention proposed here thus enables an especially efficient production of the battery.

In a further advantageous design of the present invention, during the pushing back of the housing base in the direction of the battery module, base parts of the housing base adjoining the respective gap are elastically pushed from their starting position before bending in the direction of the battery module. In other words, the cavity is initially reduced during the pushing back as compared to its original intended size after production of the battery. As soon the pressure applied for the pushing back is no longer being exerted onto the housing base, the housing base deforms elastically back into the starting position. Due to the brief reduction in the cavity when the filler has already been supplied, the filler can be especially reliably pushed or distributed into regions of the cavity lying a distance away from the gap. Advantageously, the filler is then already distributed over the greatest part of the cavity at this point in time, whereby a reliable maximum pressure is not exceeded in the cavity, despite the viscosity of the filler, and a complete filling of the cavity can still be achieved.

In order to achieve or ensure the complete filling of the cavity, further filler may additionally be supplied after the pushing back of the housing base to beyond the starting position during a buildup of the pressure used for pushing back of the housing base, that is while the housing base elastically moves back into the starting position. Due to this procedure, a quantity of filler initially supplied in the bent state can advantageously be reduced and thus the pressure occurring in the cavity can be further reduced or reliably limited without having unfilled empty space in the cavity in the end. A further advantage of the pushing back of the housing base beyond the starting position exists in that non-elastic deformation aspects that possibly occurred during bending can be balanced out. In this manner, it can advantageously be ensured that the housing base does not protrude beyond the dimensions of the battery housing intended according to specification after completion of production.

In a further advantageous design of the present invention, a size of the cavity, particularly a distance between the housing base and the battery module, is measured before and/or after the bending but before the supplying of the filler. A quantity of the filler to be supplied is then automatically adapted depending on the measured size in order to fill the cavity. The size and/or the distance may be determined, that is measured, optically, for example by means of a camera and/or by means of a laser scanning process. This can advantageously provide greater accuracy than what can be achieved or ensured during production of the battery housing and/or during positioning and attaching of the battery module. In other words, the cavity can thus always be reliably completely filled with the minimum use of filler independently of prior production or positioning inaccuracies or tolerances. In this manner, the thermally conductive connection between the battery module and the housing base can be advantageously especially reliably ensured, wherein production expense and an excess of filler can simultaneously be saved.

If only the distance between the housing based on the battery module is measured, the size of the cavity, i.e. the volume thereof, can be determined or calculated therefrom. To this end, further required dimensions, for example a width or length of the battery module and/or of the housing base or of the battery housing, may be specified as corresponding parameters or parameter values. These parameter values may be stored, for example, in a storage device of a control unit of production equipment intended for producing the battery.

The embodiment of the present invention proposed here additionally enables advantageously a use of the production equipment and/or the production method according to the invention for different types of batteries, in which, for example, differently sized cavities may be provided. In particular in this case, no manual adaptation of the quantity of filler to respectively be supplied is necessary, whereby a higher degree of automation is advantageously enabled.

In a further advantageous design of the present invention, the battery housing has several compartments, each of which has the gap, i.e. at least one gap each. The individual compartments of the battery housing in this case are separated by partition walls, which extend at least substantially parallel to one another over the housing base. The at least one respective gap in this case extends between these partition walls, preferably at least substantially in the middle between them and at least substantially parallel thereto. A battery module is then positioned in each of the compartments and a spreading of the filler in each compartment is limited by the respective partition walls. Due to the partition walls, the respective battery module can advantageously be kept in its position especially reliably.

In addition, the partition walls may ensure a further improved heat dissipation of the battery modules. To this end, the partition walls may be formed, for example, as cooling elements, for example produced from a heat-conductive material and/or interspersed with one or more cooling channels. The partition walls may likewise advantageously improve a mechanical stability of the battery. A distance between the respective gap and a point in the respective cavity the furthest away therefrom can be reduced due to the fact that the filler is supplied separately for each compartment. The viscous filler must thereby flow or be distributed less far apart from the respective gap such that, as a whole, a complete filling of the respective cavity can be achieved especially reliably even with pressure that is reduced as compared to conventional methods.

The housing base may be connected to the partition walls, i.e. attached thereto. A sufficient mechanical stability of the battery can thereby be ensured despite the flexibility or elasticity of the housing base. In addition, the housing base can be formed in multiple parts especially easily in this manner, because further attachment points are available at the partition walls, in addition to the side walls of the battery housing. For example, the partition walls may extend over an entire transverse extension of the housing base. One or two base parts can then be attached to a partition wall, said base parts then extending away from the respective partition wall in the longitudinal direction of the housing base.

A further aspect of the present invention is production equipment for producing a battery according to at least one embodiment of the production method according to the invention. The production equipment according to the invention has a traction and pressure device with an actuator for mechanically grasping as well as bending and pushing back of the housing base. Furthermore, the production equipment has an injection device with at least one movable injection head for supplying the filler through the at least one gap. In doing so, the injection device as a whole and/or the injection head may be movably retained or mounted. The injection head may be, for example, a nozzle or an outlet, which is connected to a reservoir of the filler via a corresponding line. The injection head may preferably be movable relative to a housing of the production equipment. This makes it possible to advantageously implement the intended production method according to the invention with especially low effort, because not all of the production equipment or the battery must be moved in order to position the injection head at various gaps.

The injection head, i.e. the nozzle or the outlet, may preferably have the dimensions of the gap at least substantially such that the filler can simultaneously be supplied along the entire gap, i.e. along the entire extension of the gap. The production equipment may also have several injection heads. These several injection heads may be arranged adjacent to one another such that the filler can be simultaneously supplied by several injection heads through a respective gap. Within independent control or feeding of the individual injection heads, this can advantageously enable supplying of the filler adapted to a respective shape of the cavity. For example, the cavity may have different widths or heights beyond its extension, wherein different quantities and/or supply rates of the filler may be provided or set then for different injection heads positioned at different points on the slot. This advantageously enables an especially uniform supply and distribution of the filler in the cavity.

The several injection heads may likewise be arranged apart from one another. The filler can then be supplied simultaneously through several gaps by the several injection heads. This may advantageously reduce a production time required to produce the battery, i.e. accelerate production of the battery. In addition, a mechanical and/or thermal warping of the housing base or the other parts of the battery may possibly be prevented, because the filler can be supplied simultaneously and at the same temperature over the entire surface and beyond.

The injection head may be combined with the traction and pressure device. The injection head, for example, can then be designed for establishing the mechanical contact with the housing base, for example for gripping the housing base, and for pushing back the housing base. To this end, corresponding devices or protrusions or the like may be arranged next to the nozzle or the outlet, i.e. next to an actual outlet opening for the filler. In this manner, a complexity of the production equipment can advantageously be reduced and additionally be ensured such that the injection head is always in mechanical contact with the housing base during bending and pushing back such that the filler can be especially reliably supplied through the gap. In addition, a seal can especially easily be achieved in this manner in the region of the gap and of the injection head, between them and the housing base, such that the filler, for example, cannot escape laterally between the injection head and the housing base but is instead supplied into the cavity completely through the gap.

The production equipment according to the invention is thus designed and configured for executing the production method according to the invention. Accordingly, the production equipment according to the invention may have one, some, or all of the properties and/or devices or components mentioned in connection with the production method according to the invention. This may involve, for example, the aforementioned control unit. The production equipment, particularly the control unit, may have a computer-readable storage medium with a program code or computer program stored therein, which comprises commands or control instructions, which, upon execution of the program code or computer program by the control device and/or the production equipment, prompt them to execute the production method according to the invention, i.e. to control the production equipment accordingly. To this end, the production equipment and/or the control unit may comprise a processor device, for example a microprocessor, microchip, or microcontroller, connected to the storage medium, which is designed and configured to execute the computer program or program code.

In a further advantageous design of the present invention, the production equipment has a measuring device, particularly optical, for measuring a size of the respective cavity between the housing base and the at least one battery module, particularly a corresponding distance. To this end, the measuring device may have, for example, a camera and/or a laser scanner and/or the like.

A further aspect of the present invention is a motor vehicle with a battery produced according to the method according to the invention or by means of the production equipment according to the invention. The battery this case may be particularly a traction battery of the motor vehicle. This is especially advantageous because, specifically with traction batteries, the thermal properties, particularly an effective dissipation of the heat developing in the battery, are especially important for secure and reliable operation of the battery due to the relatively high currents occurring in operation and a relatively large quantity of process heat. The motor vehicle may have, for example, a cooling circuit connected to the battery for dissipating heat from the battery.

The invention also includes further refinements of the production equipment according to the invention, which have features as they have already been described in association with the refinements of the method according to the invention and vice-versa. In order to avoid unnecessary redundancy, the corresponding refinements of the production equipment according to the invention and/or of the method according to the invention are not described separately here again.

The invention also comprises the combinations of the features of the described embodiments.

BRIEF DESCRIPTION OF THE DRAWINGS

Exemplary embodiments of the invention are described in the following. The following is shown.

DETAILED DESCRIPTION

Figure 1:
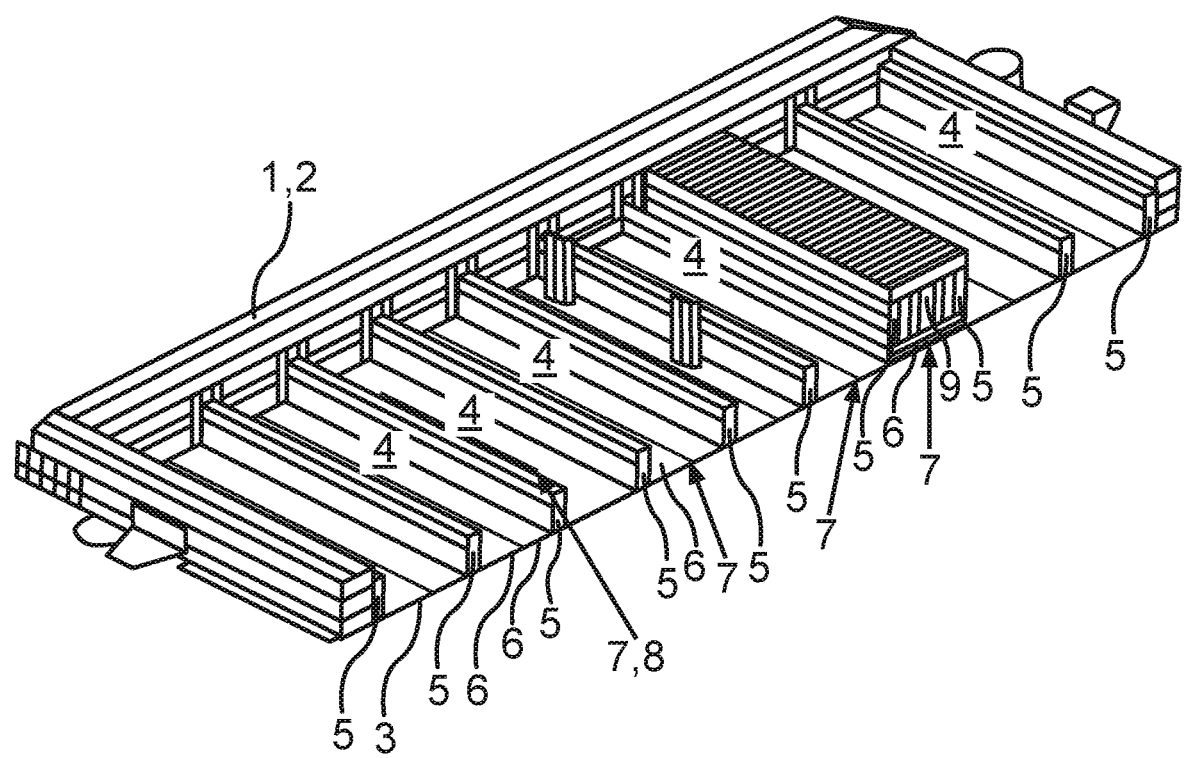
FIG. 1 a schematic, sectional perspective view of a part of a vehicle battery having a battery housing, in which a battery module is arranged.

The exemplary embodiments explained in the following refer to preferred embodiments of the invention. With the exemplary embodiments, the described components of the embodiments represent individual features to be considered independently of one another, which also further embody the invention independently of one another. Thus, the disclosure should also comprise combinations of the features of the embodiments other than those shown.

Furthermore, the described embodiments can also be supplemented through further described features of the invention.

The same reference numerals refer to equivalent features and functions in the figures.

FIG. 1 shows a schematic, sectional perspective view of a part of a vehicle battery 1 having a battery housing, which has a side wall 2 and a housing base 3. Several compartments 4, which are separated from one another by means of respective partition walls 5, are presently provided in the battery housing. The housing base 3 is designed with multiple parts in this case, wherein individual base parts 6 extend from the partition walls 5 beyond an overall lateral extension of the housing base 3 in the longitudinal direction of the battery 1, away from the respective partition walls 5. The base parts 6 in this case are separated from one another, at least in sections, by respective gaps 7.

The individual base parts 6 may be completely independent of one another or, for example, connected to one another in an edge region, for example in the region of the side wall 2. The representation is not necessarily true to scale here, particularly for the gaps 7.

The gaps 7 may extend partially or completely through the housing base 3 in the lateral direction of the battery and/or of the housing base 6. To illustrate this, a first gap 8 is shown here by example, which only partially extends through the housing base in the lateral direction. In contrast, the remaining gaps 7 in this case extend completely through the housing base 3 in the lateral direction, at least in an inner region of the battery housing. Differently than shown here, several, all, or none of the gaps 7 may be designed as the first gap 8 or as the remainder of the gaps 7.

Furthermore, the vehicle battery 1 comprises several battery modules 9 here.

For the sake of clarity, only one battery module 9 is shown here and only some of the compartments 4, the partition walls 5, the base parts 6, and the gaps 7.

The battery module 9 here is arranged in one of the compartments 4 intended for this. The remaining compartments 4, shown without equipment here, are provided for accommodating further corresponding battery modules 9.

Figure 2:
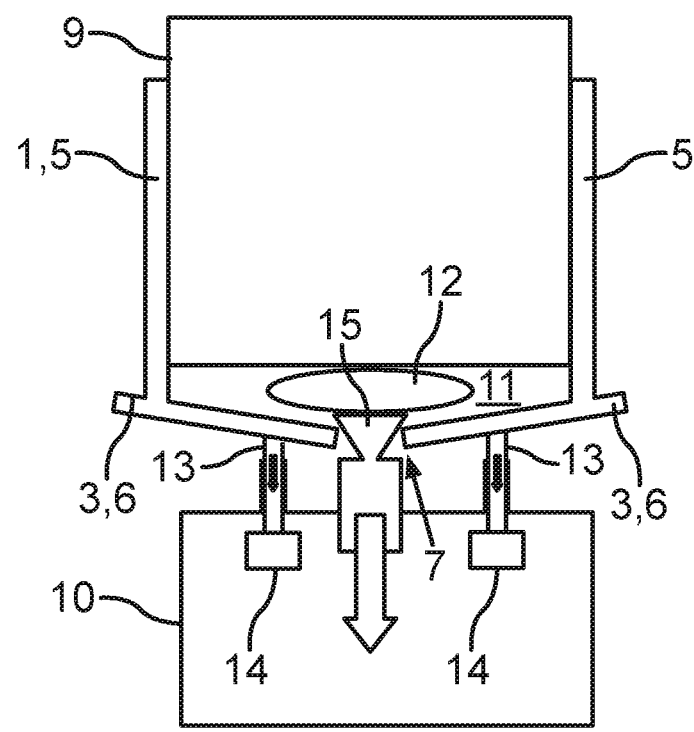
FIG. 2 a schematic sectional side view of the battery from FIG. 1 and production equipment during a production step, in sections.
Figure 3:
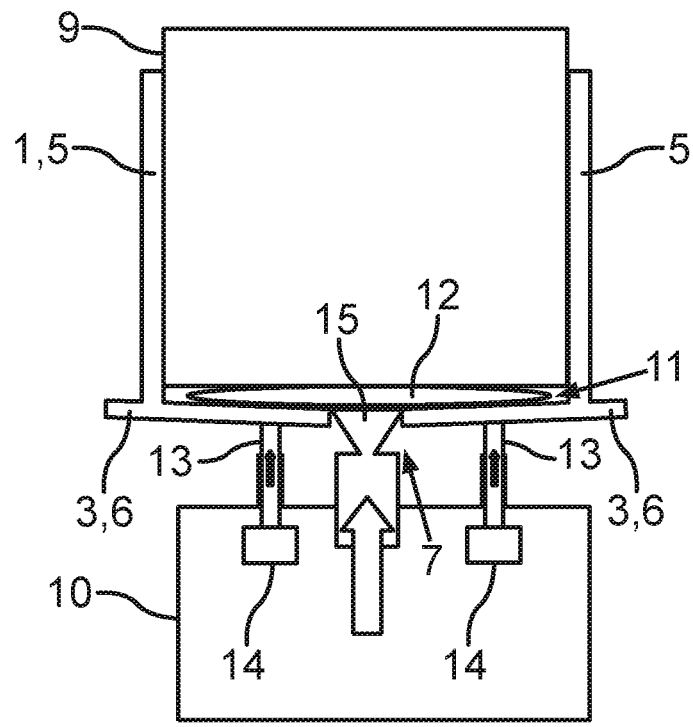
FIG. 3 the side view from FIG. 2 during a subsequent production step.

FIGS. 2 and 3 each show, in sections, a schematic side sectional view of the battery 1 from FIG. 1 as well as production equipment 10 provided for producing the battery 1 during different process or production steps. It is provided that initially the battery modules 9 are arranged in the battery housing, particularly that is in the compartments 4, and attached, for example bolted to the battery housing. In doing so, initially a distance, i.e. a cavity 11, remains free between the battery modules 9 and the housing base 3. The distance between the battery modules 9 and the housing base 3 may be, for example, at least 0.5 mm depending on the specification or requirement.

In order to enable effective heat dissipation of the battery modules 9 via the housing base and a cooling device optionally extending thereunder, the cavity 11 is intended to be filled with a filler 12, which is a viscous thermally conductive paste in this case.

It may be problematic in this case that the intended size of the distance between the battery modules 9 and the housing base 3 according to the specification is not maintained due to inaccuracies or production tolerances. Likewise, when the filler 12 is injected or pressed through the respective gap 7, a maximum permissible pressure may be exceeded in the region of the cavity 11, particularly on a bottom side of the respective battery module 9. Furthermore, due to the viscosity of the filler 12 and the relatively low height of the cavity 11, i.e. due to the relatively small distance between the battery modules 9 and the housing base 3, it may be problematic to ensure that the filler 12 actually completely fills the cavity 11. For example, a minimum degree of wetting of the bottom side of the battery modules 9 facing the housing base 3 on the inside of the housing, for example at least 95%, may be required according to specification in order to achieve the required thermal properties of the battery 1 and a more secure operation.

In order to meet these demands, a multi-stage process is provided here. To this end, the production equipment 10 has a traction and pressure device. It comprises in this case pistons 13, purely as example, which can be moved by means of the respective actuators 14. The pistons 13 in this case have a contacting device or gripping device at each of their ends facing away from the production equipment 10 to produce a mechanical contact with the housing base 3 and/or with one of the base parts 6. Once this mechanical contact is established, the pistons 13 are retracted in the direction of the production equipment 10 and thereby a tractive force is exerted onto the base parts 6, whereby the housing base 3 and/or the respective gap is bent between the two base parts 6. This movement is indicated here by a corresponding arrow. Thus, the distance is thereby enlarged between the battery module 9 and the housing base 3 and thus a size of the cavity 11 is enlarged. This state is shown in FIG. 2. The housing base 3 in this case is deformed elastically. Due to the small scope of movement of, for example, 1 mm to 3 mm provided here, it is possible to produce the housing base, for example from plastic or a metal material, such as aluminum.

The production equipment 10 further has an injection device with an injection head 15. The injection head 15 is placed on or in the gap 7.

As an alternative to the design shown here, the injection device or the injection head 15 may also establish the mechanical contact with the housing base 3 and then be pulled back in the direction of the production equipment 10, which is likewise indicated by a corresponding arrow in this case, in order to bend the housing base 3 and/or the respective gap 7.

The size of the cavity 11 may be recorded by a corresponding measuring device before and/or after the bending of the housing base 3 and/or the gap 7. This measuring device may preferably be integrated into the injection head 15. According to the recorded size or a corresponding calculated volume of the cavity 11, a quantity of filler 12 provided or to be supplied for the respective cavity 11 is then automatically adapted or set.

After the described enlargement of the cavity 11 due to the traction on the outer side of the housing base 3, the set quantity of filler 12 is supplied, for example injected, into the expanded or enlarged cavity 11 by the injection head 15 under relatively low pressure.

Subsequently, the housing base 3 is pushed back in the direction of the battery module 9 by means of the traction and pressure device and/or the injection head 15. This state is shown in FIG. 3. The base parts 6 can be pushed back through correspondingly opposite movement of the pistons 13 and/or of the injection head 15. In any case, the injection head 15 may be correspondingly adapted such that it remains in or on the gap 7 and thereby seals it off during the pushing back. Due to the pushing back of the housing base 3 and/or the base parts 6, the filler 12 is distributed in the cavity 11.

Subsequently, the mechanical connection is disrupted between the pistons 13 and/or the injection head 15 and the base parts 6, and the pistons 13 as well as the injection head 15 are again retracted, i.e. moved away from the base parts 6. Because the bending and the pushing back, i.e. a corresponding movement of the housing base 3, takes place in its elastic region, the size of the cavity 11 intended according to the specification is finally achieved.

Figure 4:
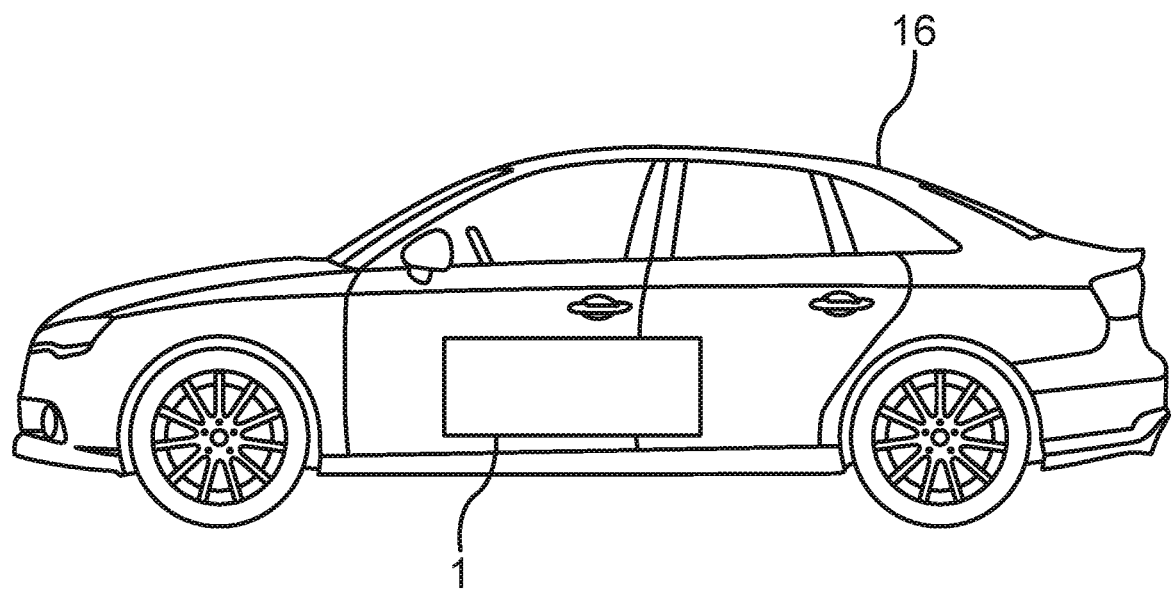
FIG. 4 a schematic view of a motor vehicle provided with a battery according to the present invention.

FIG. 4 shows a schematic side view of a motor vehicle 16 with the battery 1 produced according to the described method.

As a whole, the described examples show how a need-based cavity adaptation can be implemented during production of the battery 1 in order to enable the most secure, careful, and reliable filling possible of the cavity 11 with the filler 12.

The invention claimed is:

1. A production method for a battery with the following method steps:
    providing a battery housing with a housing base, which has at least one gap;
    positioning and attaching the at least one battery module in the battery housing such that the at least one battery module covers the respective gap;
    elastic bending of the housing base outward along the at least one gap in a direction facing away from the battery module, in order to enlarge a cavity between the battery module and the housing base;
    supplying a viscous heat-conductive filler into the cavity through the respective gap after the cavity is enlarged; and
    reversing the elastic bending by pushing the housing base back in the direction of the battery module once the viscous heat-conductive filler has been supplied into the cavity.

2. The production method according to claim 1, wherein a tractive force is exerted from outside of the battery housing onto parts of the housing base adjoining the respective gap on both sides in order to bend the housing base along the respective gap,
    wherein the tractive force is exerted by at least one actuator which mechanically grasps, as well as bends and pushes back, the housing base.

3. The production method according to claim 2, wherein during bending of the housing base, the housing base is moved no more than 3 mm away from the respective battery module, particularly at the parts of the housing base adjoining the respective gap.

4. The production method according to claim 1, wherein the filler is distributed over a surface of the battery module facing the housing base on the inside of the housing due to the pushing back of the housing base in the direction of the battery module.

5. The production method according to claim 1, wherein during the pushing back of the housing base in the direction of the battery module, base parts of the housing base adjoining the respective gap are elastically pushed in the direction of the battery module beyond the starting position they were in before being bent.

6. The production method according to claim 1, wherein:
    a size of the cavity, particularly a distance between the housing base and the battery module, is measured before and/or after the bending, before the supplying of the filler; and
    a quantity of the filler to be supplied is automatically adapted depending on the measured size in order to fill the cavity.

7. The production method according to claim 1, wherein the battery housing has several compartments, each having the gap, wherein the compartments are separated by partition walls, which extend at least substantially parallel to one another over the housing base, between which the respective gap extends, wherein a battery module is positioned in each of the compartments and a spreading of the filler in each compartment is limited by the respective partition walls.

8. A production equipment for producing a battery according to a production method according to claim 1, comprising:
    a traction and pressure device with at least one actuator for mechanically grasping as well as bending and pushing back of the housing base; and
    an injection device with at least one movable injection head for supplying the filler through the at least one gap.

9. The production equipment according to claim 8, wherein the production equipment has a measuring device, particularly optical, for measuring a size of the respective cavity between the housing base and the at least one battery module, particularly a corresponding distance.

10. A motor vehicle with a battery produced according to a method in accordance with claim 1.

* * * * *